(12) United States Patent
Pfeiffer et al.

(10) Patent No.: US 6,796,749 B2
(45) Date of Patent: Sep. 28, 2004

(54) SYSTEM FOR PNEUMATICALLY CONVEYING BULK PARTICULATE MATERIALS

(75) Inventors: John W. Pfeiffer, Hughesville, PA (US); James E. Mothersbaugh, Muncy, PA (US)

(73) Assignee: The Young Industries, Inc., Muncy, PA (US)

( * ) Notice: Subject to any disclaimer, the term of this patent is extended or adjusted under 35 U.S.C. 154(b) by 0 days.

(21) Appl. No.: 10/742,798

(22) Filed: Dec. 23, 2003

(65) Prior Publication Data

US 2004/0136792 A1 Jul. 15, 2004

Related U.S. Application Data

(62) Division of application No. 10/223,382, filed on Aug. 20, 2002, now Pat. No. 6,722,822.

(51) Int. Cl.$^7$ .............................................. B65G 53/40
(52) U.S. Cl. ..................... 406/164; 406/106; 406/182; 406/85; 406/183
(58) Field of Search ........................... 406/1, 106, 164, 406/182, 183

(56) References Cited

U.S. PATENT DOCUMENTS

| | | | | |
|---|---|---|---|---|
| 651,671 A | * | 6/1900 | Schuman | 406/164 |
| 1,553,476 A | * | 9/1925 | Schuster | 366/5 |
| 3,040,760 A | * | 6/1962 | Macks | 137/13 |
| 3,253,865 A | * | 5/1966 | Kanics | 406/86 |
| 3,281,093 A | * | 10/1966 | Barber | 406/182 |
| 3,604,758 A | * | 9/1971 | Flain et al. | 406/50 |
| 3,708,207 A | * | 1/1973 | Steele | 406/93 |
| 3,832,006 A | * | 8/1974 | Johnson | 406/164 |
| 4,116,491 A | * | 9/1978 | Ply | 406/89 |
| 4,138,161 A | * | 2/1979 | Payne | |
| 4,183,702 A | * | 1/1980 | Bonnel | 406/56 |
| 4,220,426 A | * | 9/1980 | Ply | 406/89 |
| 4,775,267 A | * | 10/1988 | Yamamoto | 406/50 |
| 4,812,086 A | * | 3/1989 | Kopernicky | 406/153 |
| 4,830,545 A | * | 5/1989 | Salter et al. | 406/12 |
| 5,722,802 A | * | 3/1998 | March | 406/46 |
| 6,227,768 B1 | * | 5/2001 | Higuchi et al. | 406/89 |

* cited by examiner

Primary Examiner—Joe Dillon, Jr.
(74) Attorney, Agent, or Firm—Stevens, Davis, Miller & Mosher, LLP

(57) ABSTRACT

A system for pneumatically conveying a bulk particulate material generally consisting of means for holding such material, having an inlet and an outlet; a first material transport line segment including a first conduit formed of a gas permeable material having an inlet communicating with the outlet of the holding means and an outlet, defining a material flow passageway, and a second conduit formed of a gas impermeable material spaced from and encompassing the first conduit, defining a plenum; a second material transport line segment including a first conduit formed of a gas permeable material having an inlet communicating with the outlet of the first conduit of the first segment, defining a continuation of the material flow passageway, and an outlet, and a second conduit section formed of a gas impermeable material spaced from and encompassing the first conduit thereof, defining a plenum; the second segment being displaceable relative to the first segment between a first position communicating the outlet of the first conduit of the second segment with a receptacle into which the material is to be conveyed, and a second position communicating the outlet of the first conduit of the second segment with the inlet of the material holding means; means for supplying gas under pressure to the plenums, causing such gas to penetrate the first conduits to fluidize material flowing in the passageways and means for inducing the flow of material in the passageways, causing material induced therein from the holding means to be impelled therethrough.

12 Claims, 4 Drawing Sheets

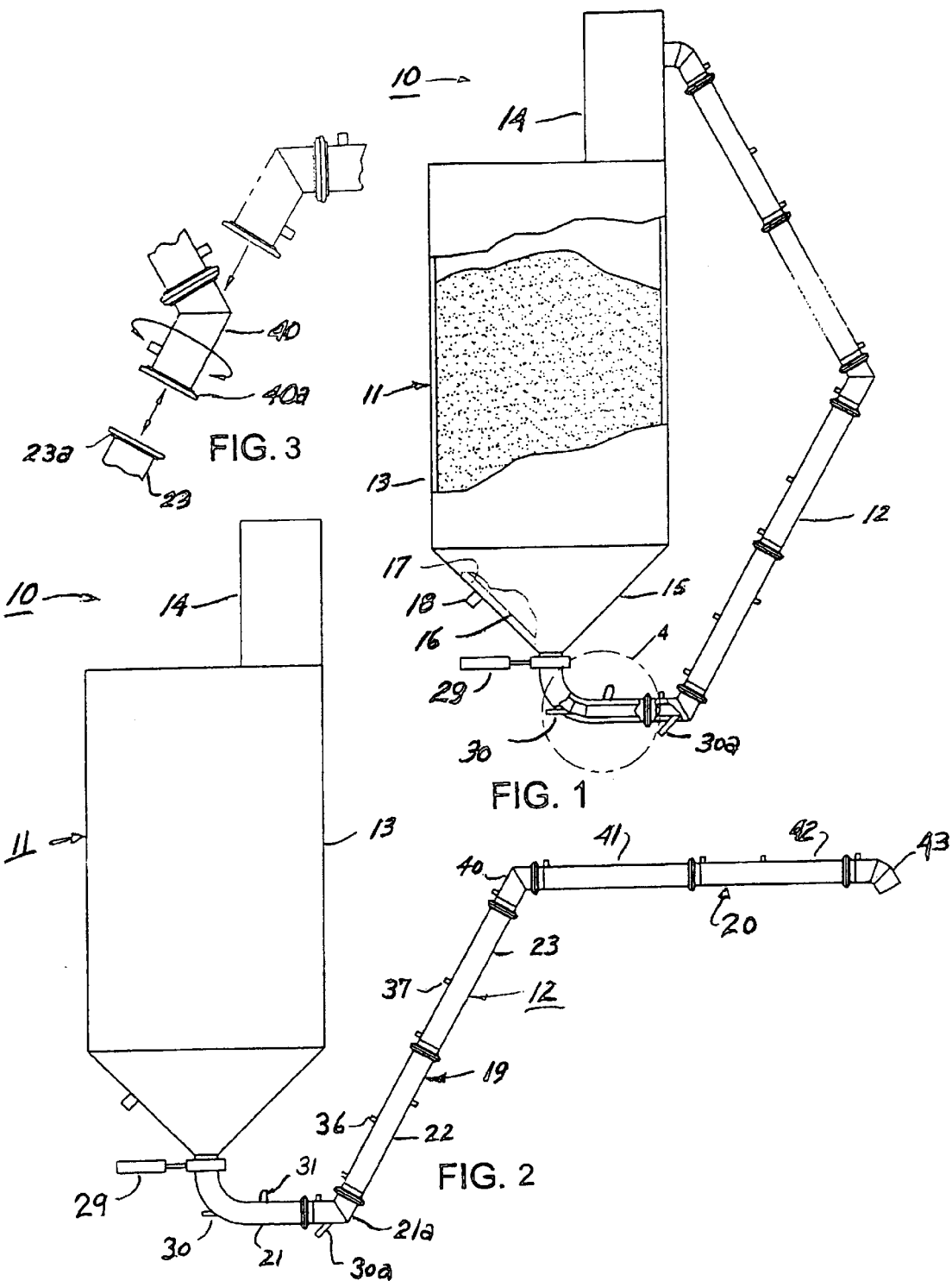

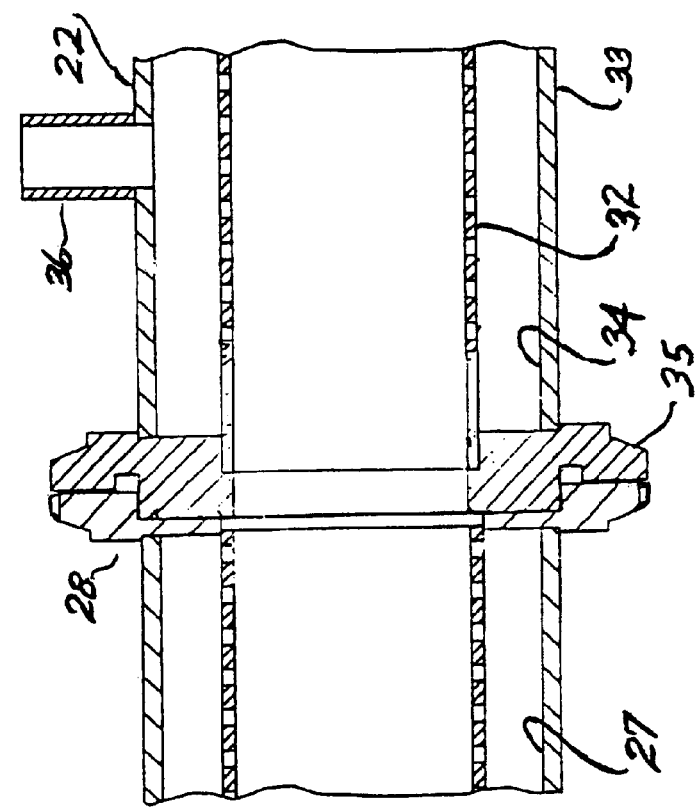
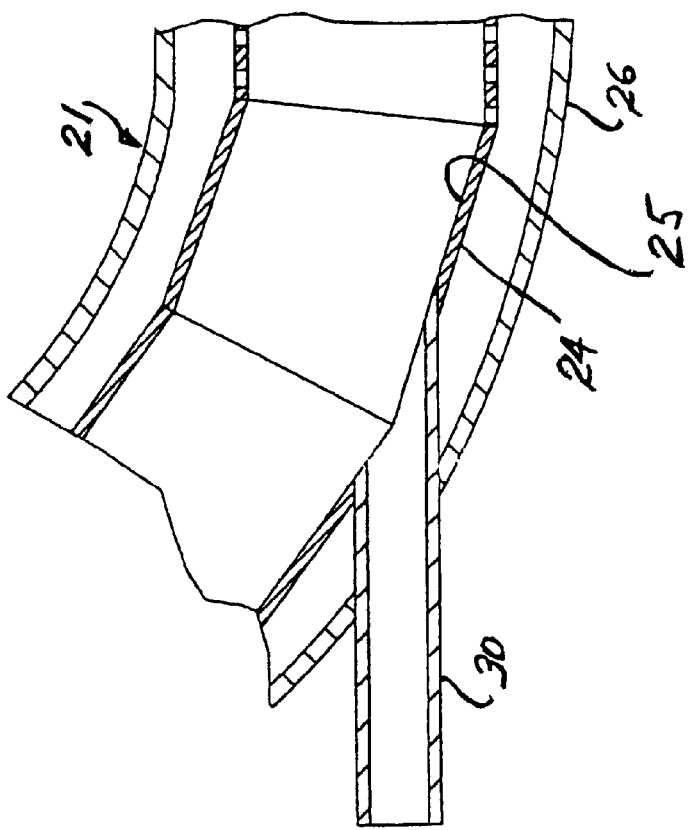
FIG. 4

SYSTEM FOR PNEUMATICALLY CONVEYING BULK PARTICULATE MATERIALS

This application is a divisional application of U.S. patent application Ser. No. 10/223,382 filed Aug. 20, 2002, now U.S. Pat. No. 6,722,822.

This invention relates to a system for pneumatically conveying bulk particulate materials, and more particularly to such a system which may be operated to purge residual material remaining in the transport line thereof following a shutdown of the system.

BACKGROUND OF THE INVENTION

In a typical system for pneumatically conveying bulk particulate materials from a first site to a second site, there is provided a material feed receptacle located at the first site, a material receiving receptacle located at the second site, a transport line receiving material from the feed receptacle and guiding it to the receiving receptacle and means for injecting air under pressure into the transport line to impel the material fed therein. Such receptacles at either of such sites may consist of storage vessels, processing equipment and various other modes of transportation including truck bodies, railway cars and ship holds.

Often, when the operation of such a system is shut down, a certain amount of material remains in the transport line which may be undesirable. Such condition could result in a distortion of measured amounts of the material being conveyed, a possible degradation of the residual material, a settling of the material causing subsequent blockage of the transport line and depending upon the material being conveyed, a possible undue deterioration of the transport line. Accordingly, it is the principal object of the present invention to provide a system for pneumatically conveying bulk particulate materials in which residual material in the transport line thereof may be readily purged upon shutdown of the system.

SUMMARY OF THE INVENTION

The present invention overcomes the problem of the deleterious effects of residual material remaining in the transport line of a pneumatically conveying system by providing a transport line thereof which is operable to return such residual material to the feed receptacle. This is accomplished by providing a transport line which either is provided with permanent means for returning such material to the feed receptacle or can be reconfigured to return such material.

BRIEF DESCRIPTION OF DRAWINGS

FIG. 1 is a side elevational view of a system for pneumatically conveying bulk particulate materials, illustrating the system in a configuration for returning material in the transport line to a material feed receptacle;

FIG. 2 is a side elevational view of the embodiment shown in FIG. 1, illustrating the system configured for conveying material to a remote material receiving receptacle;

FIG. 3 is an enlarged view of a connection of segments of the transport line of the system shown in FIGS. 1 and 2, illustrating the manner in which the transport line may be reconfigured between the material conveying and material return modes of the system;

FIG. 4 is an enlarged, vertical cross-sectional view of the portion of the transport line designated by the reference numeral 4 in FIG. 1;

DETAILED DESCRIPTIONS OF SEVERAL EMBODIMENTS OF THE INVENTION

Figure 5:
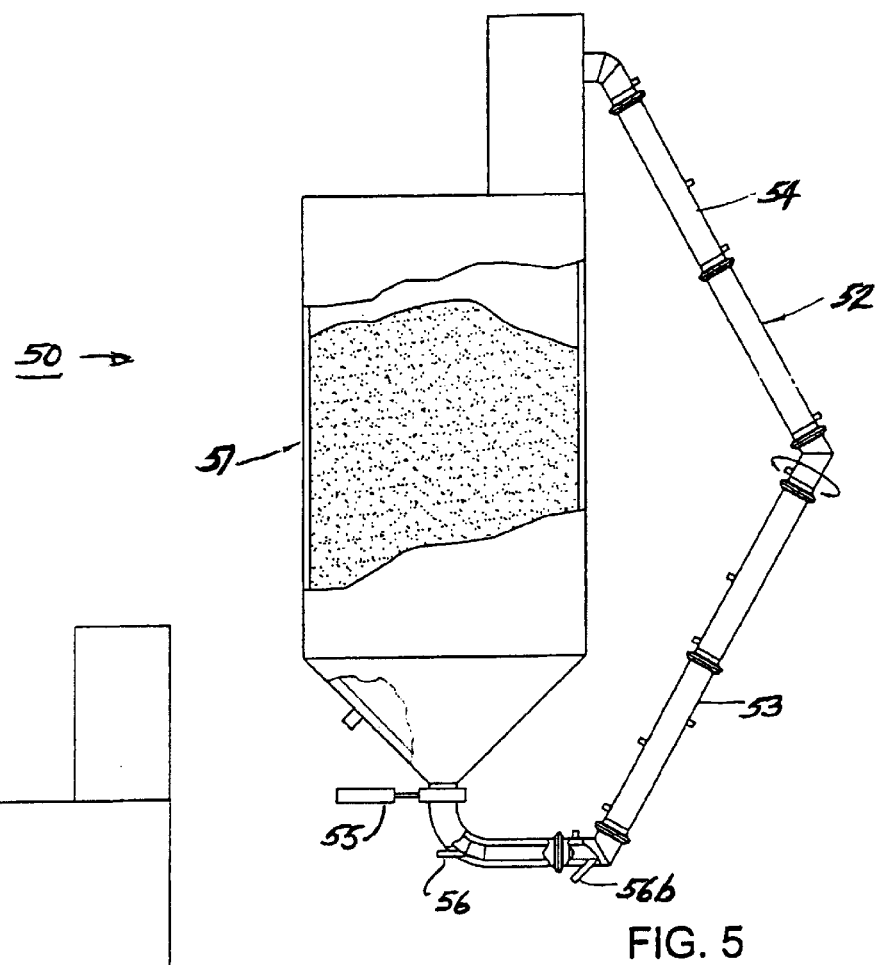
FIG. 5 is a side elevational view of another system for pneumatically conveying bulk particulate materials embodying the present invention, illustrating the transport line thereof configured to return residual material therein to the material feed receptacle.

Referring to FIGS. 1 through 3 of the drawings, there is illustrated a system 10 embodying the present invention. Generally, the system includes a vessel 11 in which a bulk particulate material to be conveyed is stored, and a transport line 12. The vessel generally is of a conventional configuration including a cylindrical, main body section 13, an upper inlet section 14 and a lower outlet section 15. The lower, outlet section has an inverted, frusto-conical configuration with a discharge outlet at the lower end thereof. As best shown in FIG. 1, the interior of lower, outlet section 15 is provided with an inverted, frusto-conically configured wall member 16 formed of a gas permeable material and spaced from section 15 to provide a plenum 17 therebetween. Air under pressure is supplied to plenum 17 through an inlet 18, which is caused to flow through permeable wall member 16 to fluidize material deposited in lower section 15 of the vessel and thus enhance the flowability of the material in the vessel through the lower outlet thereof.

Transport line 12 generally includes a lower, base segment 19 permanently connected to the lower end of the vessel, and an upper segment 20 detachably connected to the free end of lower, base section 19. Base section 19 consists of a number of units 21, 22 and 23 joined together in end-to-end relation. As best shown in FIG. 4, unit 21 includes an inner conduit 24 formed of a gas permeable material, defining a fluid passageway 25 having an inlet communicating with the outlet of vessel section 15 and an outlet, and an outer conduit 26 formed of a gas impermeable material and spaced from and encompassing inner conduit 24 to form a plenum 27. One end of outer conduit 26 is connected to vessel section 15 and the other end thereof is provided with an annular flange 28 which serves as an end wall of plenum 27.

Disposed between vessel section 15 and line section 21 is a flow control valve 29 which may be opened to permit material in vessel 11 to gravity flow into material passageway 25 of line section 21. Such valve may consist of a slide valve or a rotary valve: Material gravity fed from vessel 11 into material passageway 25 is caused to flow therethrough by means of a nozzle 30 having an inlet communicating with a source of air under pressure and an outlet communicating with material passageway 25. Such material flow in passageway 25 is enhanced by the supply of air under pressure through an inlet 31 into plenum 27 which permeates inner conduit 24 to provide a fluidized boundary layer along the interior of inner conduit 24.

Line section 22 is similar to line section 21, consisting of an inner conduit 32 formed of a gas permeable material and defining a continuation of passageway 25, an outer conduit 33 formed of a gas impermeable material, spaced from and encompassing inner conduit 32 to provide a plenum 34, an annular flange 35 forming an end wall of plenum 34 and mating with annular flange 28 of line section 21 and an annular flange comparable to annular flange 28 which forms an end wall of plenum 34 and mates with an annular flange of line section 23, comparable to annular flange 35. Air under pressure is supplied through an inlet 36 to plenum 34 which permeates inner conduit 32 to form a fluidized boundary layer similar to the fluidized boundary layer formed in line section 21 to enhance the flow of material in the passageway of line section 22. Line section 23 is essentially similar to line section 22 in construction and function. It too provides a continuation of material passageway 25 and is provided with an inlet 37 through which air under pressure is supplied to the plenum thereof for forming a fluidized boundary layer within the inner conduit of such section.

Transport line segment 20 consists of a base section 40, a pair of intermediate sections 41 and 42 and a discharge section 43, each of which sections includes an inner conduit formed of a gas permeable material communicating with and forming a continuation of passageway 25, and an outer conduit formed of a gas impermeable material spaced from and encompassing the inner conduit thereof to form a plenum. Each of such plenums is closed at the ends thereof and is provided with an inlet connected to a source of air under pressure. Air supplied to such plenums similarly permeates the inner conduits of such segment to form a fluidized boundary layer in the material passageway to similarly facilitate the flow of material being conveyed therethrough.

The mating flanges of the conduit sections of segments 19 and 20 may be joined together by any suitable means including welding, bolting and clamping. Since line segment 20 is intended to be detached and repositioned relative to line segment 19, as illustrated in FIG. 3, annular flange 40a of conduit section 40 is either clamped or bolted to annular flange 23a of conduit section 23 when such flanges are mated together as shown in FIGS. 1 and 2.

The lengths, configurations and interrelationships of the transport line segments are designed to permit segment 20 to be arranged in a first position relative to segment 19, positioning the outlet of discharge conduit section 43 in communication with the inlet of a receptacle into which material stored in vessel 11 is to be conveyed, as shown in FIG. 2, and a second position relative to segment 19, positioning the outlet of discharge conduit section 43 in communication with the inlet of vessel section 14, to purge material from the transport line and convey such material back into vessel 11, as shown in FIG. 1. In the specific embodiment shown in FIGS. 1 through 4, conduit section 21 is substantially horizontal with a curved end section connected to flow control valve 29, conduit sections 22 and 23 are disposed at an angle of approximately 60° and conduit sections 41 and 42 are disposed substantially horizontally or at an angle of approximately 120° relative to conduit sections 22 and 23, when the system is in the material conveying and loading mode, and sections 41 and 42 are disposed at an angle of approximately 240° relative to sections 22 and 23 when the system is in the line purging mode as shown in FIG. 1.

When it is desired to operate the system shown in FIGS. 1 through 4 to convey material from vessel 11 through transport line 12 and load such material in a selected container, the transport line is configured as shown in FIG. 2, air under pressure is supplied to the plenums of the conduit sections to form a fluidized boundary layer along the material passageway of the transport line, a high velocity stream of air is injected into such passageway through nozzle 30, valve 29 is opened to allow material from the vessel to gravity flow into the transport line and be entrained in the motive air injected into the transport line, and air under pressure is applied to the plenum in lower section 15 of the vessel to form a fluidized boundary layer along permeable wall section 16 to facilitate the gravity flow of material from the vessel to the transport line. When the desired amount of material has been conveyed and loaded in the selected receptacle, and it is desired to shut down the system, the control valve is closed, the fluidizing air supply and motive air injection is discontinued, line section 20 is disconnected from line section 19, repositioned from the position shown in FIG. 2 to the position shown in FIG. 1 and reconnected to segment 19 and motive of air is then injected through nozzle 30 to purge residual material in the transport line and return it to vessel 11. Depending on the size of the system, the repositioning of segment 20 may be performed manually or through the use of a hoist.

Figure 6:
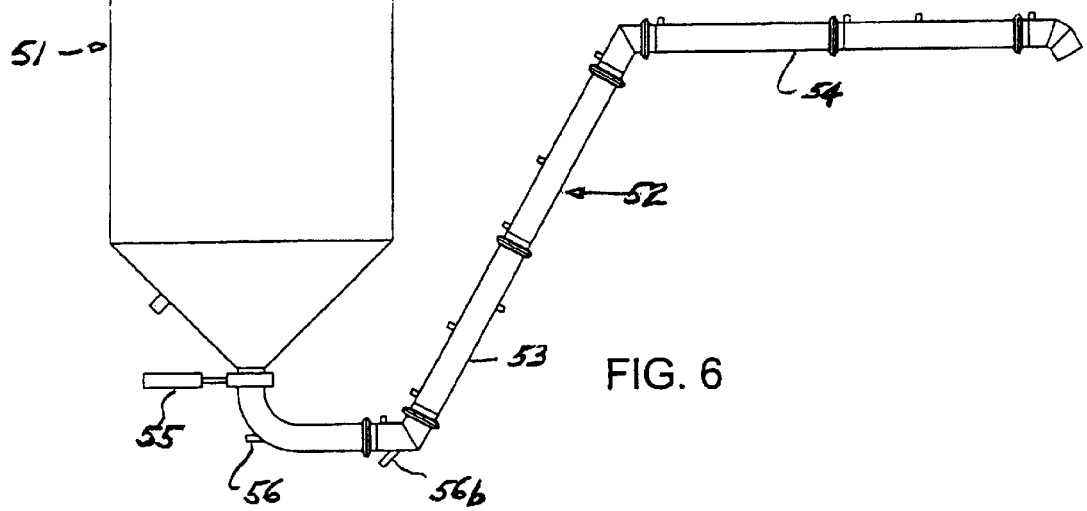
FIG. 6 is a side elevational view of the system shown in FIG. 5, illustrating the transport line thereof configured to convey material to a remote material receiving receptacle.

Referring to FIGS. 5 and 6, there is illustrated a system 50 consisting of another embodiment of the invention. The system is similar to the system shown in FIGS. 1 through 4 and includes a material storage vessel 51 comparable to vessel 11 and a material transport line 52 consisting of line segments 53 and 54, similar to transport line 12 with the exception of the means provided for connecting line segment 54 to line segment 53. Line segment 54 is swivelly connected to line segment 53 so that line segment 54 may be swiveled between the conveying and loading position as shown in FIG. 6 and the material return position as shown in FIG. 5. Line section 54 may be repositioned relative to line segment 53 manually, manually through the assistance of a hoist assembly or mechanically through the use of a motor mounted on segment 53 operatively connected to segment 54 through a suitable gearing arrangement. The lengths, configurations and interrelationships of the line segments similarly may be designed to permit the outlet of segment 54 to be positioned to communicate with a selected receptacle during the conveying and loading mode of the system and, alternatively, the positioned to communicate with the inlet of vessel 51 during the purging mode of the system.

In the operation of the system shown in FIGS. 5 and 6, when it is desired to convey and load material into a selected receptacle, the transport line is configured as shown in FIG. 6, fluidizing air is supplied to the transport line and motive air is injected into the passageway of the line, control valve 55 is opened to allow the gravity flow of material from the vessel into the transport line to be entrained and conveyed therein and fluidizing air is supplied to the lower section of the vessel to enhance the gravity flow of material from the vessel to the transport line. When the loading of the material has been completed and it is desired to shut down the system, control valve 55 is closed, the supply of fluidizing air and the injection of motive air is discontinued, the transport line is reconfigured from the configuration shown in FIG. 6 to the configuration shown in FIG. 5 simply by swiveling line section 54 relative to line section 53 about an axis coinciding with the longitudinal center line of line section 54 and then injecting motive air through nozzle 56 to purge material from the transport line and redeposit it in vessel 51. The manner in which line segment 54 is swiveled relative to line segment 53 will depend on the size and weight of the segments. In smaller, comparatively lighter transport lines, line segment 54 perhaps may be swiveled manually. In larger, heavier transport lines, a hoist device or mechanical means may be required to swivel line segment 54.

Figure 7:
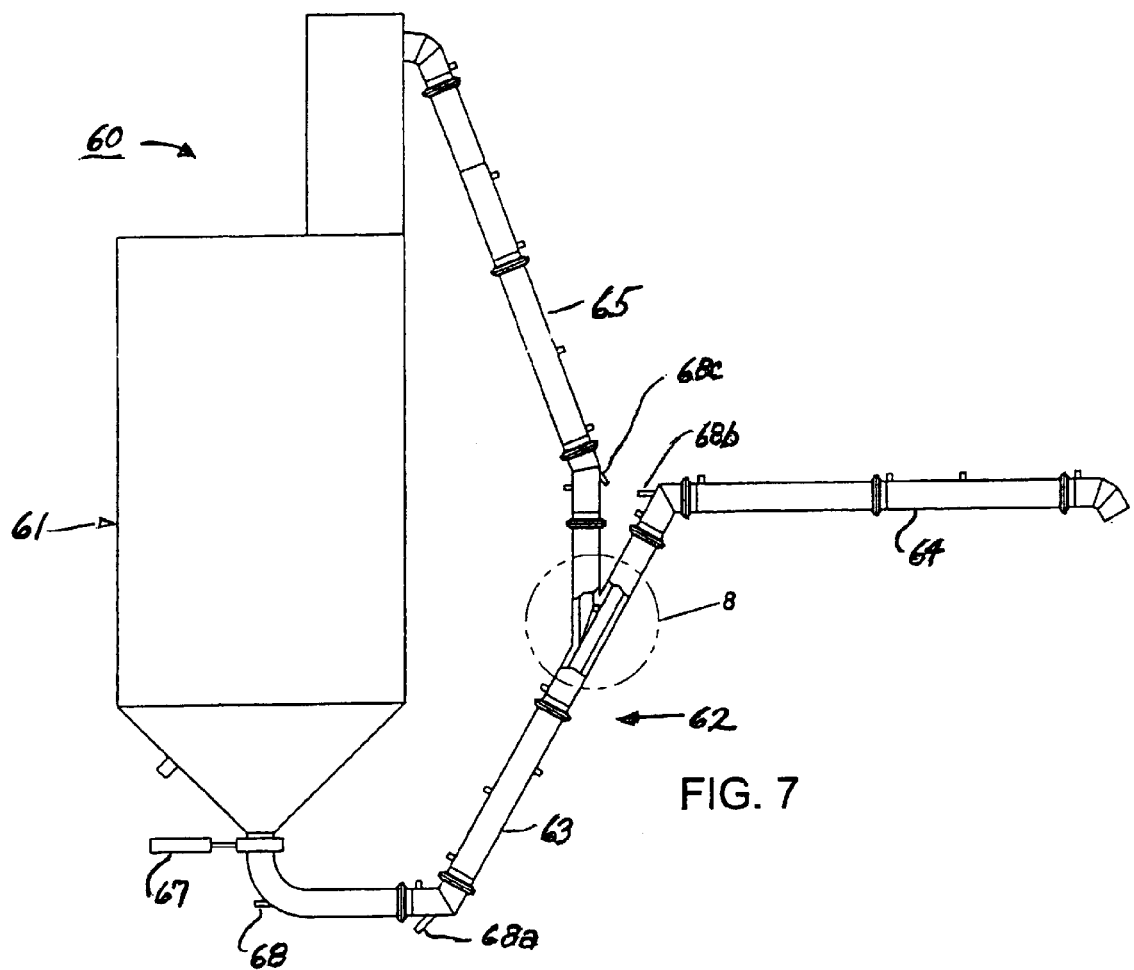
FIG. 7 is a side elevational view of a system for pneumatically conveying bulk particulate materials, having the capability of alternately conveying material to a remote material receiving receptacle and returning residual material in the transport line to the feed receptacle.
Figure 8A:
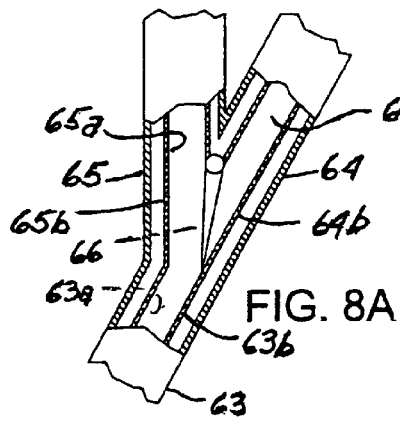
FIG. 8A is an enlarged, cross-sectional view of the portion of the transport line of the system shown in FIG. 7, designated by the reference numeral 8, illustrating the position of a diverter valve causing residual material in the transport line to be returned to the feed receptacle.
Figure 8B:
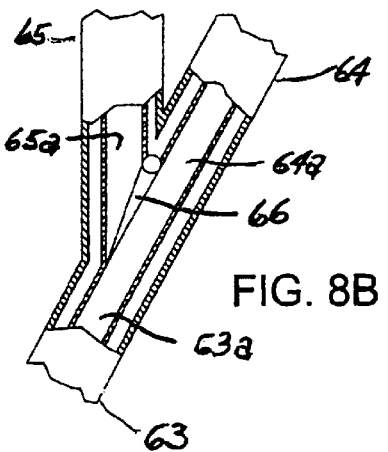
FIG. 8B is a view similar to the view shown in FIG. 8A, illustrating the position of the diverter valve in the transport line for conveying material to the remote material receiving receptacle.

FIGS. 7, 8A and 8B illustrate a still further embodiment of the invention. The embodiment consists of a system 60 including a material storage vessel 61 and a material transport line 62. Vessel 61 also is similar to storage vessel 51 described in connection with the first embodiment, and transport line 62 is similar in construction and function to transport line 52 with the exception of providing an additional line segment in lieu of having one of the segments displaceable relative to another segment thereof. Specifically, transport line 62 includes a base segment 63, a first branch segment 64 and a second branch segment 65. Base segment 63 is comparable in construction and function to line section 22 of the system shown in FIGS. 1 through 4, and branch segment 64 is similar in construction and function to line segment 20 of such system with the exception of being permanently connected to the end of base segment 63 in lieu of being displaceable relative thereto. Branch section 65 is similar in construction to branch segment 64 and interconnects an intermediate portion of base section 63 with the inlet of vessel 61. Referring to FIGS. 8A and 8B, it will be seen at base segment 63 includes a material passageway 63a defined by inner, gas permeable conduit 63b, branch segment 64 includes a material flow passageway 64a forming a continuation of material flow passageway 63a, defined by inner gas permeable conduit 64b and branch segment 65 includes a material flow passageway 65a defined by gas permeable conduit 65b which communicates with material flow passageway 63a. Provided at the juncture of the branch segments, is a diverter valve 66 which functions to divert the flow of material from passageway 63a to continuing passageway 65a when in the position as shown in FIG. 8A, and to cause material flowing in passageway 63a to continue to flow in passageway 64a when in the position as shown in FIG. 8B.

In the use of the system shown in FIGS. 7, 8A and 8B to convey and load material into a selected receptacle, diverter valve 66 is operated to position it as shown in FIG. 8B, fluidizing air is supplied to the line segments, motive air is injected into the material flow passageway of line segments 63 and 64, valve 67 is opened to allow material in vessel 61 to gravity flow into the passageway of line segment 63 to be entrained in the high velocity air injected into such passageway, and fluidizing air is supplied to the lower section of the vessel to enhance the gravity flow of material being discharged from the vessel. After the desired amount of material has been conveyed from the storage vessel and loaded into the selected receptacle, and it is desired to discontinue the operation and close down the system, control valve 67 is closed to discontinue the flow of material into the transport line, diverter valve 66 is operated to position it as shown in FIG. 8A and the motive air injected into the transport line is allowed to continue to purge the residual material in the material flow passageway by causing it to flow through passageway 65a of branch line 65 and be discharged into the upper end of vessel 61. Once the transport line has thus been purged, the fluidizing air supply and motive air injection may be discontinued to correspondingly shut down the system.

Although the several embodiments of the invention as described have been described as having a single nozzle for injecting a high velocity stream of air into the material flow passageway of the transport line to provide the motive force in conveying the material, it is to be understood that additional such nozzles may be employed to impel the material in the flow passageway of the transport line, particularly where the material flow passageway changes direction. Examples of such additional nozzles for providing additional motive force are nozzle 31a in the embodiment shown in FIGS. 1 through 4, nozzle 56b of the embodiment shown in FIGS. 5 and 6 and nozzles 68a, 68b and 68c in the embodiment shown in FIGS. 7 through 8B. In addition, although the segments of the transport lines of the several embodiments have been described as providing inner permeable conduits defining the material flow passageway in the line and a plurality of plenums into which pressurized air may be supplied, impermeable conduits may be employed defining the material flow passageway, and in applications utilizing a gas permeable inner conduit defining the material flow passageway, a single plenum may be employed into which pressurized air may be supplied to permeate the inner conduit and thus form a fluidized boundary layer in the material flow passageway.

The transport lines of the described embodiments may be utilized to convey both particulate materials from a first site to a second site and also to purge material in the line and return it to the first site upon shutdown of the system. Either of such sites may consist of a material storage vessel, some mode of transportation such as a truck container, a railway car and a ship's hold or a process apparatus. The transport line not only permits the conveyance of precise measured amounts of material but assures removal of residual material in the passageway thereof which could degrade, cause subsequent blockage in the system or cause deterioration of the line components, depending on the nature of the material used with the system.

From the foregoing detailed description it will be evident that there are a number of changes, adaptations, and modifications of the present invention which come within the province of those persons having ordinary skill in the art to which the aforementioned invention pertains. However, it is intended that all such variations not departing from the spirit of the invention be considered as within the scope thereof as limited solely by the appended claims.

We claim:

1. A system for pneumatically conveying a bulk particulate material comprising:
    means for holding said material, having an inlet and an outlet;
    a first material transport line segment including a first conduit formed of a gas permeable material having an inlet communicating with said outlet of said holding means and an outlet, defining a material flow passageway, and a second conduit section formed of a gas impermeable material spaced from and encompassing said first conduit section thereof, defining a plenum;
    a second material transport line segment including a first conduit formed of a gas permeable material having an inlet communicating with said outlet of said first conduit of said first segment, defining a continuation of said material flow passageway, and an outlet, and a second conduit section formed of a gas impermeable material spaced from and encompassing said first conduit section thereof, defining a plenum;

a third material transport line segment including a first conduit formed of a gas permeable material having an inlet communicable with said outlet of said first conduit of said first segment, defining a continuation of said material flow passageway, and an outlet communicating with said inlet of said holding means, and a second conduit formed of a gas impermeable material spaced from and encompassing said first conduit section thereof, defining a plenum;

means for selectively communicating said material flow passageway of said first segment with one of the material flow passageways of said second and third segments;

means for supplying a gas under pressure to said plenums, causing gas to penetrate said first conduits to fluidize material flowing in said passageway; and means for inducing the flow of material in said passageways, causing material introduced therein from said holding means to be impelled through said passageway of said first segment and selectively through said passageways of said second and third passageways.

2. A system according to claim 1 wherein said means for selectively communicating said passageway of said first segment with one of said second and third passageways, comprises a diverter valve.

3. A system according to claim 1 wherein said flow inducing means comprises a nozzle communicable with a source of gas under pressure.

4. A system according to claim 1 wherein said source of gas is operable to provide a gas under pressure the range of 80 to 120 psig.

5. A system according to claim 1 wherein said first segment includes a first section and a second section disposed at an angle to said first section, and including means for injecting a gas under pressure into the passageway of raid second section.

6. A system according to claim 1 including a valve disposed between said holding means and said first segment.

7. A system according to claim 1 wherein said holding means comprises a vessel.

8. A system according to claim 1 wherein said vessel includes an inverted, frusto-conically configured lower section.

9. A system according to claim 7 including means for fluidizing material disposed in said lower section.

10. A transport line for pneumatically conveying a bulk particulate material from a material holding means, having an inlet and an outlet, selectively from said holding means to a selected site and back to said holding means comprising:

a first segment including a first conduit formed of a gas permeable material having an inlet communicable with said outlet of said holding means and an outlet, defining a material flow passageway, and a second conduit section formed of a gas impermeable material spaced from and encompassing said first conduit thereof, defining a plenum;

a second segment including a first conduit formed of a gas permeable material having an inlet communicable with said outlet of said first conduit of said first segment, defining a continuation of said material flow passageway, and an outlet and a second conduit formed of a gas impermeable material spaced from and encompassing said first conduit thereof, defining a plenum;

a third segment including a first conduit section formed of a gas permeable material having an inlet communicable with said outlet of said first conduit of said first segment, defining a continuation of said material flow passageway, and an outlet communicable with said inlet of said holding means, and a second conduit formed of a gas impermeable material spaced from and encompassing said first conduit thereof, defining a plenum;

means for selectively communicating said material flow passageway of said first segment with one of the material flow passageways of said second and third segments;

means for supplying a gas under pressure to said plenums, causing gas to penetrate said first conduit sections to fluidize material flowing in said passageways; and means for inducing flow of material in said passageways, causing material introduced therein to be impelled through said passageway of said first segment and selectively through said passageways of said second and third segments.

11. A transport line according to claim 10 wherein said flow inducing means comprises a nozzle communicable with a source of gas under pressure.

12. A transport line according to claim 10 wherein said first segment includes a first section and a second section disposed at an angle to said first section, and including means for injecting air under pressure into the passageway of said first section.

* * * * *

UNITED STATES PATENT AND TRADEMARK OFFICE
CERTIFICATE OF CORRECTION

PATENT NO. : 6,796,749 B2
DATED : September 28, 2004
INVENTOR(S) : John W. Pfeiffer et al.

It is certified that error appears in the above-identified patent and that said Letters Patent is hereby corrected as shown below:

Column 7,
Line 36, "raid" should read -- said --.
Line 42, claim reference number "1" should read -- 7 --.
Line 45, claim reference number "7" should read -- 8 --.

Signed and Sealed this

Twenty-eighth Day of June, 2005

JON W. DUDAS
*Director of the United States Patent and Trademark Office*